United States Patent [19]
Gilmore

[11] 3,916,519
[45] Nov. 4, 1975

[54] PIPE CUTTING MACHINE
[75] Inventor: Guy T. Gilmore, Houston, Tex.
[73] Assignee: Multi-Fab, Inc., Houston, Tex.
[22] Filed: May 29, 1974
[21] Appl. No.: 474,231

[52] U.S. Cl. .................... 30/97; 82/4 C; 82/70.2
[51] Int. Cl.² ...................... B23B 3/04; B23B 3/22
[58] Field of Search .................... 30/93–97; 82/4 C, 60, 72, 59, 66, 70.1, 70.2, 71, 72

[56] References Cited
UNITED STATES PATENTS

| | | | |
|---|---|---|---|
| 1,932,462 | 10/1933 | Howlett | 30/97 |
| 2,271,582 | 2/1942 | Dixon | 30/97 |
| 2,291,395 | 7/1942 | Levey | 30/97 |
| 3,164,062 | 1/1965 | Hogden | 82/4 |
| 3,361,017 | 1/1968 | Baumgarten | 82/4 |
| 3,421,492 | 1/1969 | Brown | 82/4 |
| 3,540,329 | 11/1970 | Gill | 82/4 |
| 3,608,194 | 9/1971 | Miller | 30/94 |
| 3,688,615 | 9/1972 | Protze et al. | 82/70.2 |
| 3,840,170 | 10/1974 | Arikawa et al. | 30/97 |

Primary Examiner—Al Lawrence Smith
Assistant Examiner—Robert C. Watson
Attorney, Agent, or Firm—Ranseler O. Wyatt

[57] ABSTRACT

An improved power operated pipe cutter machine capable of use on a broad range of pipe diameters. The pipe cutting machine comprises a central housing and a pair of angularly adjustable struts on each end thereof, each of the struts carrying a roller for movably supporting the machine on the pipe surface. A plurality of mandrels are alternately used with the machine depending on the pipe diameter. Each mandrel commonly is characterized by adapter arms fitting into the pipe to support the machines. Circumferential mobility is imparted to the machine on small pipes by a chain drive straddling the protruding mandrel.

3 Claims, 7 Drawing Figures

PIPE CUTTING MACHINE

BACKGROUND OF THE INVENTION

This invention pertains to circumferential pipe cutting machines. More particularly the invention relates to pipe cutting of design enabling operability on both very small and very large pipes.

Pipe cutting machines adapted to be automatically driven around the circumference of a pipe are old and well known. These machines, such as shown for example in U.S. Pat. No. 2,747,274, are generally characterized by a relatively limited capability with respect to the size of pipe upon which they may operate. This is due to the fact that such machines are generally affixed to the pipe by a circumferential track or the like, which track is sized to fit the pipe's circumference. Although some designs may contemplate the utilization of variable diameter tracks, the range of pipe diameters upon which the machine itself may operate is relatively limited due to the design of the machine itself. It is generally found that pipe cutting machines capable of operating on multiple size pipes may so operate only on either relatively large multiple size pipes or relatively small multiple size pipes, but not on both. Heretofore, efforts to design a pipe cutting machine having a broad range of pipe diameter cutting capability has met with machines that are generally unstable, or ineffective at one or both ends of the pipe size scale. Moreover, inherent difficulties are encountered in designing an effective transmission gear box mechanism which can move the pipe cutting machine at a satisfactory speed over a broad range of pipe sizes and thicknesses.

BRIEF DESCRIPTION OF THE INVENTION

The pipe cutting machine of the present invention comprises a central housing which contains the gear box and constitutes the principal support for a pair of adjustable struts that are supported from each end thereof. There is carried on each end of each of the pair of struts a roller which is adapted to contact the external surface of the pipe to be cut and which functions to move the pipe cutting tool carried by the machine around the circumference of the pipe. The pair of struts on each end are angularly adjustable with respect to one another so as to accommodate the variable size circumference pipe, the minimal circumference pipe being straddled by the adjustable struts when they are in their more retracted position. The machine is movably affixed to the circumference of relatively large pipes by a precision mandrel adapted to fit within the end of the pipe in fixed relation thereto and to carry a circumferential precision track affixed on the surface of the pipe at the end thereof adjacent the mandrel. The rollers of one of the adjustable struts is disposed within the precision track so as to guide the machine in a true circumferential path as it cuts the pipe. When used for the cutting of relatively small circumferential pipe or when used in general for the facing of pipe ends, a mandrel extending from the pipe end and along the axis thereof is used to support the machine. The mandrel is fixed by the aforementioned adapters within the pipe and a precision track characterizes the surface of the mandrel so as to receive a strut roller therein for accomplishing a true circumferential path of movement of the machine with respect to the pipe end. Utilization of a continuous chain drive straddling both the machine and the protruding mandrel, the latter extending from either a relatively large or small pipe which is to be cut or faced, enables a broad range of application of the machine with respect to both pipe size and cutting or facing function. The effectiveness in operation of the machine is produced not only by the alternative mandrel designs but also by the adjustable strut characteristics which facilitate stability of the machine on the pipe or protruding mandrel surface. These features, in conjunction with an improved gear box design provide for a pipe cutting machine having markedly improved capabilities, reliability and which is significantly favorable with respect to both manufacturing cost and ease of operation when compared to similar function machines.

These and other features and advantages of the invention will become more readily apparent upon a reading of the following detailed description, claims and drawings, wherein like numerals denote like parts in the several views and wherein:

DETAILED DESCRIPTION

Figure 1:
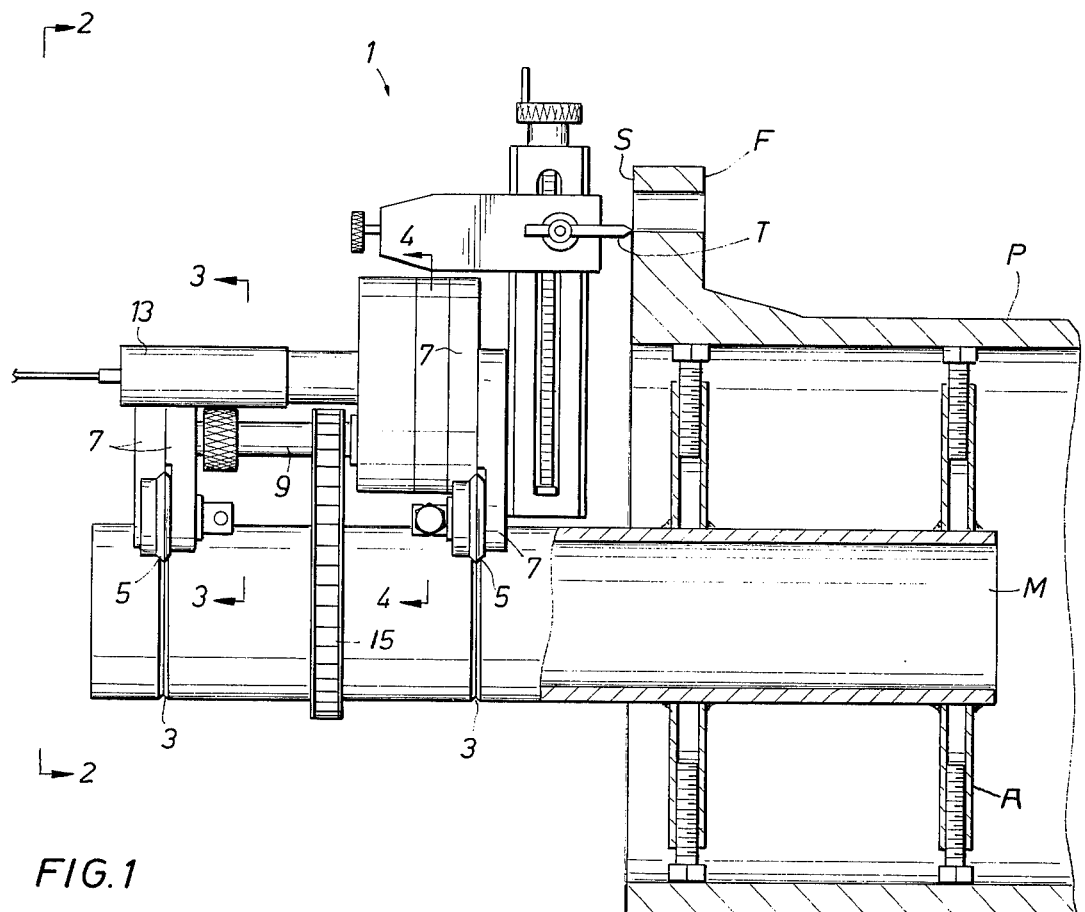
FIG. 1 is a longitudinal sectional view through a pipe showing an internal mandrel supporting a cutting machine in accordance with the invention hereof.

With reference to FIG. 1 there is shown a pipe P having a flange F which includes a facing surface S to be machined by a cutting tool T. The tool T is carried by the improved cutting machine 1 which is the subject hereof. The cutting machine is stably supported with respect to pipe P by means of a protruding mandrel M which is supported, in cantilever fashion, from within the end of the pipe P by a plurality of adapter arms A that extend between the external surface of the mandrel and the interior surface of the pipe. The adapter arms are characterized by interior threads that cooperate with threads on the surface of adapter arm extensions E which engage the interior surface of said pipe to thereby fix the mandrel and pipe in stable relation to one another. The cantilevered end of mandrel M is characterized by one or more precision tracks 3 which are intended to receive cooperating rollers which carry machine 1 in a circumferential path around the mandrel, and of course concomitantly around the pipe P. The path of movement of machine 1 is thereby inherently circumferentially true with respect to mandrel M and, assuming the careful installation of mandrel M within the pipe P the path will be inherently true with respect to the pipe circumference also.

Figure 2:
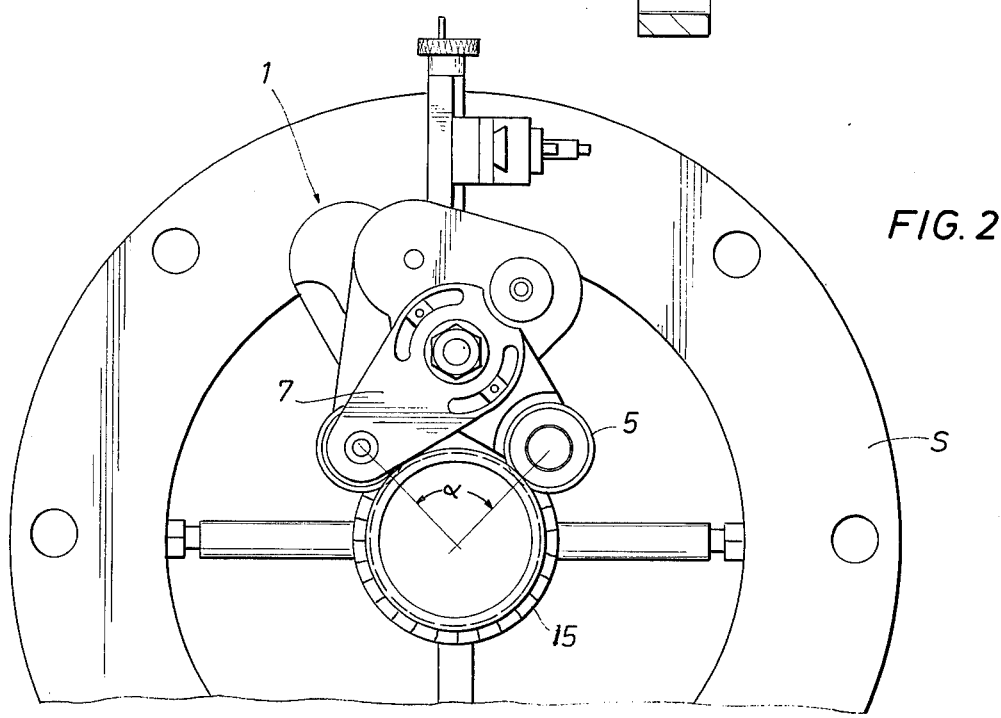
FIG. 2 is a view facing the cutting machine and pipe end along the plane 2—2 of FIG. 1.

As additionally and more clearly shown in FIG. 2, the rollers 5 which carry the machine 1 are affixed to adjustable struts 7, there being a pair of struts arranged at each end of the machine. The struts are disposed in angularly related pairs so that the rollers supported thereon may, upon adjustment of the angular relation of the struts, contact an ample, and variable, included angle $\alpha$ of the mandrel circumference. The angle $\alpha$ constitutes the angle included between the radii line extending from the mandrel axis to the tangent line defining the intersection of the rollers with the mandrel surface. Each of the struts are pivotally affixed to an axle bearing supported in coaxial alignment with main drive shaft 9. An air motor 13 is mounted above the machine, as described hereinafter, and is disposed in axial alignment with the gear box, also described hereinafter, for imparting rotational movement to the drive shaft 9. Affixed to the drive shaft 9 is an appropriate drive gear which engages the driver chain 15. The chain 15 is of endless design so as to straddle the exterior surface of mandrel M while being driven by the gear (not shown) attached to drive shaft 9. Thus, it may be visualized that actuation of drive shaft 9 through motor 13 induces movement of the machine 1 about the circumference of mandrel M along the path determined by track 3, this occurring by the sequential engagement of the teeth of drive gear in the links of the driver chain 15. Such movement of the machine of course produces a correlative movement of the cutting tool T in a circular path around the flange surface S.

Figure 3:
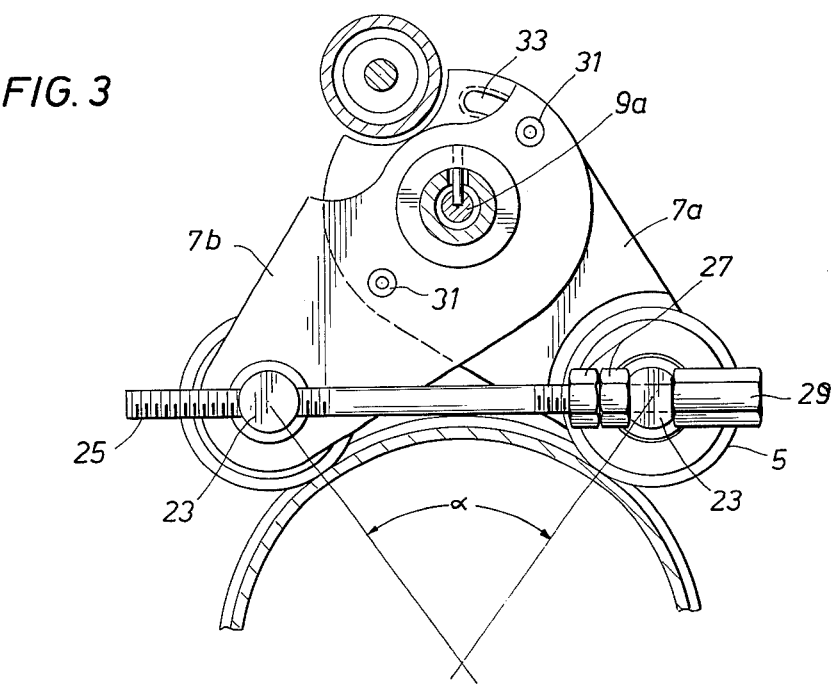
FIG. 3 is a sectional view through the cutting machine of FIG. 1 along the plane 3—3 thereof.

With reference now to FIG. 3, there is shown in more specific detail certain aspects of the machine. Each of the pair of adjustable struts 7 are pivotally mounted on an axle 9a extending from each end of main drive shaft 9. The struts 7 are designated at each end of the axle 9a as inner 7b and outer 7a struts. The inner and outer struts at each end of the axle are mounted thereon by a hex nut 21 recessed within the surface of outer strut 7b. The distal end of each strut is characterized by a bore (not numbered) in which the mounting axle 23 for each of the rollers 5 is disposed. The mounting axles are preferably located interiorly of the struts so as to thereby avoid exterior protuberances in the work area. The interior protruding end of mounting axles 23 are characterized by a slot normal to the axle itself and which is adapted to receive a turnbuckle rod 25. The turnbuckle rods are appropriately threaded and are adapted to receive the lock nuts 27 and end nut 29. The lock nuts 27 are threadably movable along the length of the turnbuckle rod 25 so that the rod may be threaded into or out of one or the other mounting axles 23 while the end nut 29 cooperates with the lock nut 27 to fix the relative position of the rollers 5 and thereby increase or reduce the size of included angle $\alpha$. This of course enables ready adaptation of the machine on a broad range of pipe diameters. Ancillary locking of the struts 7 is accomplished through the use of lock screw 31 which may be tightened through a common moon shaped bore 33 in order to draw each of the pair of struts 7a, b together.

Figure 4:
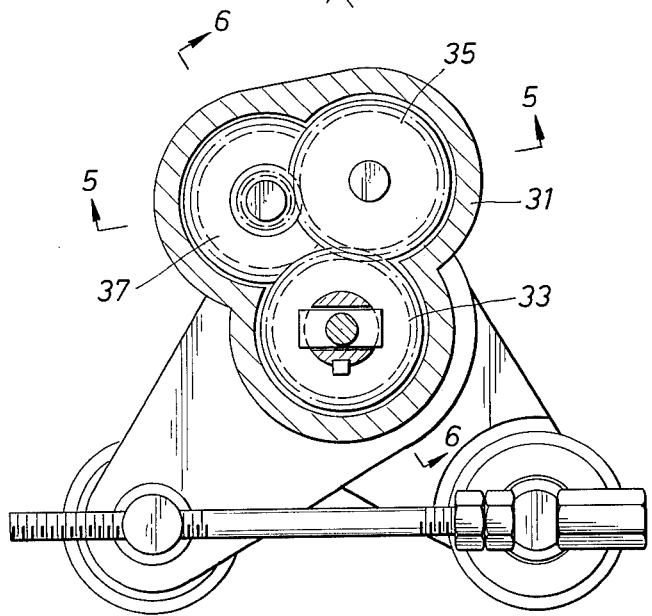
FIG. 4 is a sectional view through the cutting machine of FIG. 1 along the plane 4—4 thereof.
Figure 5:
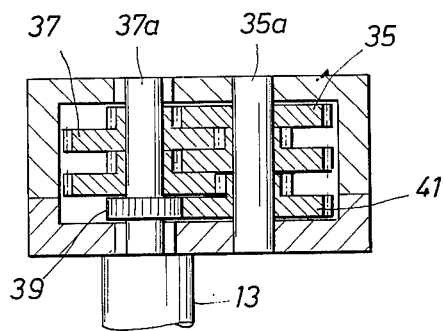
FIG. 5 is a sectional view through the gear box of the cutting machine along the plane 5—5 of FIG. 4.
Figure 6:
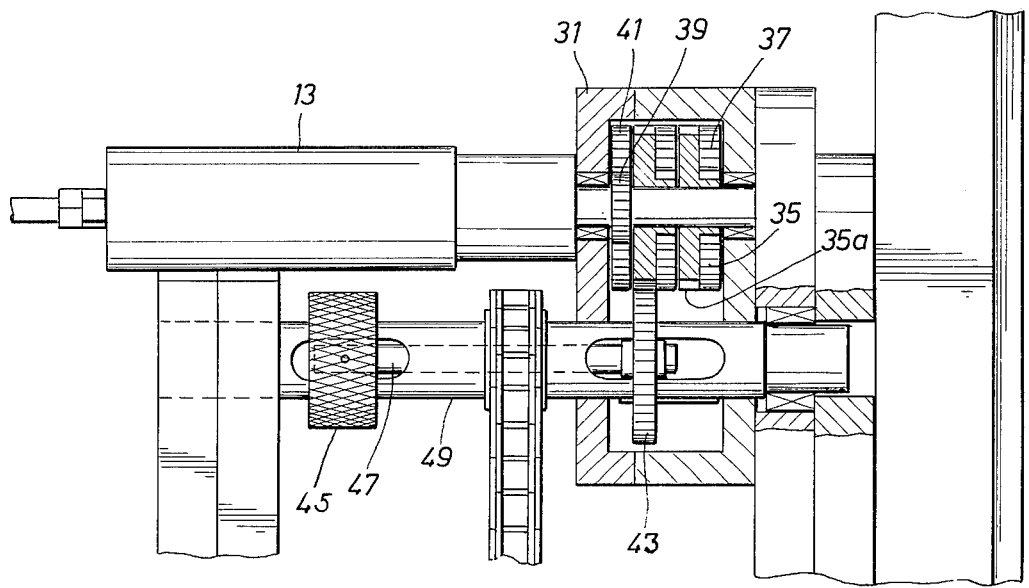
FIG. 6 is a sectional view through the cutting machine of the invention along the plane 6—6 of FIG. 4.

In FIG. 4 is shown the general configuration of central housing 31 which is adapted to contain the machine drive gears. The housing 31 is generally located in alignment with drive means which preferably constitutes the air motor 13; see FIG. 6. The air motor is characterized by an air line extending from supply source (not numbered). The central housing preferably contains a five speed gear arrangement produced by a gear disposition generally shown in FIG. 4 wherein the gears are placed in overlapping rotational arrangement upon each of several axes. The gears, designated 33, 35 and 37, are further shown in FIG. 5 which illustrates a cross sectional view through the plane 5—5 of FIG. 4. Two sets of gears 35, 37 are mounted respectively on their shafts 35a, 37a. A prime drive gear 39 is mounted on the end of shaft 37a proximate the drive shaft of air motor 13. The gear arrangement in housing 31 is further illustrated in FIG. 6 wherein the prime drive gear 39 is shown in its operative position with respect to the machine. Here it is shown that the shaft 35a may be adapted to carry a plurality of gears (not numbered) in addition to second drive gear 41; and that there is disposed in engaging relation with this plurality of gears a shift gear 43 carried on the main drive shaft 9. The shift gear 43 may be displaced longitudinally on the shaft 9 so as to engage one or the other of the plurality of gears, which are in turn adapted to engage either of the plurality of gears mounted on shaft 37a (see FIG. 5) so as to thereby impart to the machine a substantial range of speeds as it moves around the circumference of the mandrel. The machine may thus accomplish a substantial range of cutting or machining operations and the movement speed of the machine may thus be varied in accordance with numerous factors such as the metal being worked and the depth of the cut. Actual movement of shift gear 43 is manually accomplished by a shifting sleeve 45. The shifting sleeve 45 and gear 43 are integrally connected to one another by coupling rod 47 which is generally disposed within the tubular housing 49 that surrounds drive shaft 9. As further shown in FIG. 6, the chain drive 15 is disposed to engage chain gear 51 fixedly connected to main drive shaft 9 so that rotation of drive shaft 9 caused by movement of shift gear 43 results in rotation of the chain gear. Such rotation of the chain gear causes sequential engagement of the links in the chain itself. Since the chain itself does not move because of its straddling engagement with the circumference of the pipe, the rotational movement of the chain gear 51 imparts to the machine a directional movement opposite to that of the chain gear. The specific path of movement of the machine is, as previously noted, determined by the tracks 3 the rollers 5 on at least one end of the machine such as on a strut 7a, 7b, engage each one side of the track (see FIG. 3) so that in effect at least one pair of rollers contacts both sides of a track in order to enhance positive directional movement.

Figure 7:
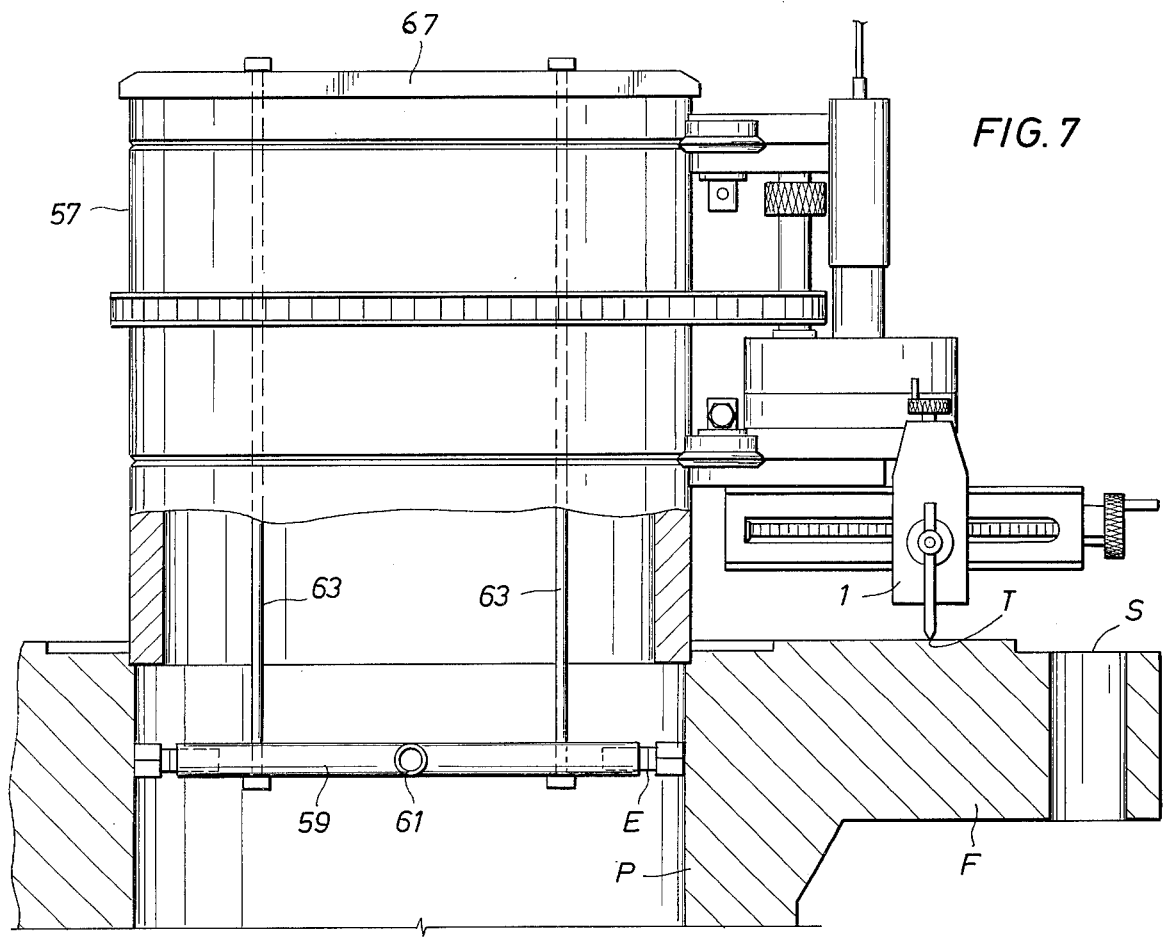
FIG. 7 illustrates an alternative form of mandrel in connection with the cutting machine of the invention.

In FIG. 7 there is shown a somewhat different application of machine 1. Here the machine 1 is adapted to operate on a larger diameter pipe than that shown in FIG. 1. The principal difference exists in the form of the mandrel M and the supports therefor. The mandrel is characterized by a casing 57 approximating the interior diameter of the pipe P. The flange F of the pipe includes the surface S to be machined by operation of the cutting tool T mounted on machine 1. The machine, like that disclosed with reference to FIG. 1, is capable of cutting at conventional compound angles and includes necessary controls such as a feed knob, (not numbered) for that purpose. The mandrel casing 57 constitutes a precision piece of tubing and is generally adapted to fit inside the pipe for supporting the machine which is to work upon the flange surface S. Therefore, there is disposed within the pipe a circular adapter 59 which is mounted fixedly through the interior circumference of the pipe P by means of the threaded extensions E. The adapter 59 is characterized by one or more bracing rods 61 which extend across the diameter of the pipe interior to the other side of the adapter in order to reinforce the adapter itself. The mandrel casing 57 extends outwardly from adapter 59 and is supported in cantilever manner therefrom by a plurality of drawbolts 63 which are fixed at their first end to the adapter itself and at their protruding end to a holddown plate 67. The holddown plate 67 constitutes a means for anchoring the drawbolts 63 and for clampingly supporting the mandrel casing to the adapter 59 in fixed relation to the pipe. The casing 57 may be further characterized by the presence of one or more precision tracks 3 machined into the surface thereof or attached to the surface of the mandrel casing.

In operation of the machine 1 for the purpose of facing a pipe flange surface it is first necessary to install the mandrel of either FIG. 1 or FIG. 7. The choice of mandrel and the actual installation thereof is determined by the diameter of the pipe. In relatively small pipes wherein the circumferential travel of the machine is relatively small the adapter type shown in FIG. 1 is appropriate while larger diameter pipes will require a greater circumferential travel of the machine 1, thus necessitating the large diameter mandrel of FIG. 7. In either case, the precision tracks 3 constitute the guiding means for determining the path of travel. Also in either case, actual travel of the machine 1 is accomplished after attachment of the endless chain to the circumference of the mandrel at an appropriate distance from the working surface. The machine itself is then positioned to the mandrel with at least one of the pair of tracking rollers 5 disposed with opposing roller surfaces on each side of a track 3. Similarly, the rollers and track may be of such configuration as to alternately have the rollers within a recessed track or thereupon a protruding surface track on the mandrel. Once the machine is properly installed upon its mandrel, or if desired upon the surface of the pipe itself and on which a track has been attached, the cutting tool is appropriately positioned and the drive means 3 actuated. An operator proceeds then to position the cutting tool and perform the requisite operational work on the pipe. Upon completion, the machine 1 is withdrawn, the chain 15 detached, and the machine 1 removed. Thereafter, the mandrel may, upon the mere loosening of one or more extensions E, be removed with facility.

It is urged that the above description should not be understood in a sense which limits the invention strictly to the precise details of construction explained and shown in the accompanying drawings since it is obvious that these details may be modified without departing from the principles of the invention. For example, the machine itself may readily be used directly on the surface of a pipe in connection with an attached track. Thus it may be used both with or without the particular mandrels shown or it may be used in connection with other mandrels not shown since it is only necessary to effectively accomplish fixed positioning of the machine with respect to the working surface. The mandrels shown are believed to illustrate optimal methods for accomplishing this.

I claim:

1. In an improved apparatus for performing work functions on pipes of varying diameters, the combination including:
    a mandrel means adapted to be affixed to the pipe so as to serve as a supporting base for the machine, said mandrel means including a surface means on which the machine traverses a path of movement while performing its operation on the pipe,
    a machine movably affixed on the mandrel means, said machine including a strut means affixed at each end thereof, each said strut means including a pair of cooperating strut legs, at least one of said strut legs being angularly adjustably mounted with respect to its cooperating leg,
    a roller means rotatably affixed to each said strut legs for supporting said machine on the pipe surface, and,
    longitudinally adjustable coupling means having the first end thereof affixed to one of said strut legs and the other end affixed to the cooperating strut leg so that the angle defined by the radii lines from the mandrel axis to the points of contact of said roller means on the pipe may be changed in order to adapt the machine for stable movement when working on varying diameter pipes,
    said surface means comprises a protruding track, the roller means on said cooperating legs being mounted so that each roller means bears on opposing sides of said protruding track to thereby enhance control of directional movement.

2. In an improved apparatus for performing work functions on pipes of varying diameters, the combination including:
    a mandrel means adapted to be affixed to the pipe so as to serve as a supporting base for the machine, said mandrel means including a surface means on which the machine traverses a path of movement while performing its operation on the pipe,
    a machine movably affixed on the mandrel means, said machine including a strut means affixed at each end thereof, each said strut means including a pair of cooperating strut legs, at least one of said strut legs being angularly adjustably mounted with respect to its cooperating leg,
    a roller means rotatably affixed to each said strut legs for supporting said machine on the pipe surface, and,
    longitudinally adjustable coupling means having the first end thereof affixed to one of said strut legs and the other end affixed to the cooperating strut leg so that the angle defined by the radii lines from the mandrel axis to the points of contact of said roller means on the pipe may be changed in order to adapt the machine for stable movement when working on varying diameter pipes,
    said machine includes a drive means,
    a drive shaft,
    gear means operatively coupling said drive means and drive shaft,
    an endless chain means disposed in stradling position about said drive shaft and said mandrel means, said endless chain being in firm engagement with the mandrel means and drive shaft so that actuation of said drive means produces movement of the machine on said surface means while simultaneously holding the machine firm on the mandrel means during its entire movement.

3. The combination of claim 2 wherein said gear means includes a plurality of gears mounted in optional ratio positions so as to achieve variable speed movement of the machine on the mandrel means, and
    shift means operatively coupled to said gear means and said drive shaft for varying the speed of the machine movement on the mandrel means.

* * * * *